Patented Mar. 7, 1939

2,149,310

UNITED STATES PATENT OFFICE 2,149,310

ALKALI CELLULOSE

Floyd C. Peterson, Syracuse, N. Y., and Albert T. Maasberg, Midland, Mich., assignors to The Dow Chemical Company, Midland, Mich., a corporation of Michigan No Drawing. Application November 10, 1937,
Serial No. 173,852

3 Claims. (Cl. 260—233)

This invention relates to the preparation of alkali cellulose and especially to an alkali cellulose from which a low viscosity cellulose ether may be prepared.

In the preparation of highly etherified cellulose by the interaction of alkali cellulose and etherifying agents such as ethyl chloride or benzyl chloride, the viscosity of the cellulose ether varies directly with the viscosity of the cellulose from which such ether is prepared. More particularly, the viscosity of a highly etherified cellulose varies directly as the viscosity of the cellulose in the alkali cellulose from which the ether is prepared.

The cellulose ethers most valuable to the coating composition and related arts are those which dissolve readily in various common solvents. More specifically, such ethers contain from about 2.0 to about 2.75 etherifying substituent groups per anhydro-glucose unit. For many purposes the preferred cellulose ether is one having a low intrinsic viscosity. This is especially true in the case of lacquers and similar solutions of cellulose derivatives which owe most of their viscosity to the cellulose derivative present. In such compositions, the lower the intrinsic viscosity of the cellulose derivative employed, the greater is the amount of such derivative which can be dissolved to form a solution whose viscosity is in a particular range.

Cellulose ethers having the aforesaid number of substituent groups may be prepared from alkali celluloses of widely varying alkali: cellulose and water: cellulose ratios. The most economical alkali cellulose is one having an alkali: cellulose ratio from about 1:1 to about 4:1 and a water: cellulose ratio varying between about 0.3:1 and 2.0:1. The production of low viscosity cellulose ethers from such an alkali cellulose has ordinarily been accomplished by etherifying the alkali cellulose regardless of its viscosity and thereafter reducing the viscosity of the cellulose ether to the desired extent, suitably by treatment thereof with acids or other compounds capable of producing the same result. This procedure is objectionable as it results in the formation of cellulose ethers, from which films and filaments are produced which are too brittle and too unstable for present day commercial applications.

It is among the objects of this invention to provide a process for the preparation of an alkali cellulose from which cellulose ethers of very low viscosity may be produced. Another object is to provide a process for the preparation of low viscosity alkali cellulose adapted to be employed in etherification reactions, and from which cellulose ethers may be formed having greater tensile strength than do such low viscosity cellulose ethers prepared by previously known methods. A further object is to provide a process whereby a low viscosity alkali cellulose may readily be prepared. Our invention then is concerned with a process whereby the viscosity of the cellulose in an alkali cellulose may be reduced, without a proportional reduction of such physical properties as tensile strength of ether films and filaments producible therefrom.

In a co-pending application of the present inventors, Serial Number 151,156, filed June 30, 1937, of which this application is a continuation-in-part, there is set forth a method whereby the viscosity of cellulose in alkali cellulose containing alkali and water in ratios corresponding to a 60–80 per cent, and preferably 75–78.5 per cent alkali solution, may be reduced to about 8 to 15 centipoises when measured in a 3 per cent solution of the cellulose dissolved in a cuprammonium hydroxide reagent containing 30 grams of copper and 180 to 200 grams of ammonia per liter. Said method consists in aging the alkali cellulose at temperatures varying from about 5 centigrade degrees below the "hardening point" thereof, to the temperature at which injurious degradation occurs, i. e. to about 130° C. It is stated in the afore-mentioned co-pending application that for ease of control the aging is ordinarily carried out at temperatures between the hardening point and 100° C.

We define the hardening point of alkali cellulose as the temperature at which the slope of a cooling curve, wherein the temperature of a warm alkali cellulose aggregate is plotted against cooling time, changes materially, and becomes more nearly parallel with the time axis. This corresponds to the temperature at which alkali dust becomes noticeable when an alkali cellulose is being cooled and shredded. The hardening point of an alkali cellulose containing alkali and water in ratios corresponding to an alkali solution of from 60 to 80 per cent concentration, is approximately 15 to 18 centigrade degrees lower than the freezing point of an alkali solution of the aforesaid 60 to 80 per cent concentration. For example, an alkali cellulose containing alkali and water in ratios corresponding to a 65 per cent solution of sodium hydroxide in water has a hardening point of about 47° C. whereas the freezing point of a 65 per cent aqueous solution of sodium hydroxide is about 63° C.

Similarly, the hardening point of an alkali cellulose, wherein the alkali and water content corresponds to an alkali solution of about 75 per cent, has a hardening point of approximately 56° C., while the freezing point of 75 per cent aqueous sodium hydroxide solution is about 72° C.

We have now found that the viscosity of cellulose in alkali cellulose may be further reduced without material degradation of the cellulose molecule and that it is possible to prepare from such alkali cellulose highly etherified derivatives having very low intrinsic viscosities and surprisingly high tensile strengths. This result is made possible by aging an alkali cellulose, while agitating or tumbling the same, in the temperature range defined above, until the alkali cellulose forms into small, densely compacted, nearly spherical granules. The viscosity of the cellulose in the alkali cellulose, at which this granulation or ball-formation occurs, is about 7 to 10 centipoises when determined in the manner outlined above. The size of the granules ordinarily varies in diameter from about $\frac{1}{16}$ to about $\frac{3}{8}$ inch. If the aging is carried out for from 1 to 5 hours after ball formation originally occurs, the granules become compacted into harder pellets, and the cellulose viscosity curve, plotted against aging time, undergoes no further change, i. e. the viscosity has reached its minimum value under the conditions of temperature and alkali concentration employed and the curve is parallel to the time axis. In order to etherify an alkali cellulose which has formed granules or pellets, it is ordinarily desirable to effect a further mechanical disintegration of the product, suitably by shredding or grinding. Such finely divided alkali cellulose, wherein the cellulose has a viscosity ordinarily in the range from about 3.5 to about 7.5 centipoises, will yield, for example, an ethyl cellulose having a viscosity in the range from approximately 3.5 to about 8 centipoises when dissolved to form a 5 per cent solution by weight in a solvent consisting of 80 parts of toluene and 20 parts of ethanol by volume.

In a preferred method of carrying out our invention an alkali cellulose which has been prepared at a temperature above its hardening point, suitably by immersing a cellulosic aggregate in a bath of liquid sodium hydroxide having a concentration between about 60 and about 80 per cent, and preferably between about 75 and 78.5 per cent, and which has been allowed to swell to its maximum dimension after being removed from the alkali bath, is shredded as rapidly as possible to a fine state of subdivision with simultaneous cooling until the alkali cellulose begins to set up or harden, at which point alkali dust becomes noticeable in the atmosphere above the mass being shredded. The finely divided alkali cellulose is then removed from the shredder, placed in a suitable container, and stored in a room where the temperature is controlled at a point in the range from slightly below the hardening point of such alkali cellulose to about 100° C. In most cases the lower temperature limit for satisfactory aging is about 5 centigrade degrees below the hardening point of the alkali cellulose but we prefer to operate at a temperature of from 5 to 15 degrees above said hardening point. The alkali cellulose is left exposed to such temperature conditions while being agitated or tumbled to provide more efficient heat transfer between the atmosphere of the aging room and the fibrous alkali cellulose mass. After from about 7 to about 20 hours, depending upon the alkali:cellulose ratio, the alkali cellulose becomes sufficiently reduced in viscosity to exhibit the granulation or balling-up effect previously described. When this stage is reached, the material may reasonably be assumed to have a viscosity of approximately 7 to 10 centipoises. Additional aging of from 1 to 5 hours results in formation of smooth, relatively hard pellets of alkali cellulose, and provides an alkali cellulose of as low a viscosity as we have been able to produce by the present method, i. e. down to about 3.5 centipoises. The aging step may, if desired, be conducted in a substantially moisture-free and $CO_2$-free atmosphere. Agitation may be effected in open or closed revolving drums, tumblers, screen hoppers and the like, or in rotary kilns or other means capable of causing a substantially uniform tumbling or turning of the alkali cellulose particles.

The following table sets forth a comparative study of the rates of viscosity reduction of a particular batch of alkali cellulose at various temperatures from both below and above the hardening point of said alkali cellulose. The alkali cellulose employed in the aging experiments was prepared by continuously passing a sheet of cellulose fibres at a rate of 16 feet per minute into and through a bath of 76 per cent aqueous sodium hydroxide solution at a temperature of 108° C. The period of contact between the cellulosic sheet and the liquid alkali was 8 seconds. The alkali:cellulosic ratio of the product prior to aging was approximately 1.91:1 while the water:cellulose ratio was about 0.625:1. The hardening point of this alkali cellulose is about 60° C. Viscosity measurements were made as previously described on 3 per cent solutions of the cellulose from alkali cellulose in the standard cuprammonium hydroxide reagent.

*Table I*

| Sample No. | Time, hours | Viscosity, centipoises | | | |
|---|---|---|---|---|---|
| | | 45° C. | 55° C. | 65° C. | 75° C. |
| 1 | 0 | 29.4 | 29.4 | 29.4 | 29.4 |
| 2 | 2 | 27.3 | 26.6 | 19.12 | 12.45 |
| 3 | 3½ | 25.3 | 22.85 | 14.76 | |
| 4 | 5 | 26.78 | 21.3 | 13.8 | |
| 5 | 7 | | | 19.65 | 17.1 | 9.31 |
| 6 | 10 | 25.7 | | 9.28 | 4.36 |
| 7 | 15 | 21.4 | 14.0 | 6.6 | 3.65 |
| 8 | 20 | 19.05 | 12.5 | 5.1 | 3.68 |
| 9 | 27 | 18.43 | 8.84 | 5.63 | 3.74 |
| 10 | 36 | 15.65 | 10.2 | 4.5 | 3.9 |

The sample aged at 45° C. showed only very slight balling-up even after 36 hours. The same aged at 55° C. began to show evidence of balling-up at about 30 to 36 hours but the tendency in this direction was slight and it is believed that the temperature of 55° C., which was about 5° below the hardening point of this alkali cellulose, was insufficient for properly controlled aging of this type of alkali cellulose. The samples aged at 65° and 75°, respectively, i. e. at from 5 to 15° above the hardening point of the alkali cellulose, began to exhibit ball formation at about the 5-hour stage and were showing definite signs of agglomeration at from 10 to 15 hours. In the interval from 15 to 20 hours the samples aged at 65° and 75° C. became entirely converted into spherical granules. It is observed from the table that after this length of time no appreciable further reduction in viscosity occurs at these temperatures. It would appear, therefore, unnecessary to continue the aging step more than about 5 hours beyond the point at which definite balling-up of the samples occurs. When aging is continued beyond this period the granules increase in density and, to a certain extent, in individual size, forming relatively hard pellets of alkali cellulose which may be conveniently stored without danger of material degradation due to oxidation and without any further substantial viscosity reduction.

A similar series of experiments was conducted on a different alkali cellulose prepared by employing an aqueous alkali solution of about 76.5 per cent sodium hydroxide concentration. In this run a study was made of the "bulk value", i. e. the apparent density of the alkali cellulose, at frequent intervals through the aging operation. The results are given in the following table, expressed in terms of grams of alkali cellulose occupying 100 milliliters of volume.

Table II

| Sample No. | Time, hours | Apparent density | | | |
|---|---|---|---|---|---|
| | | 45° C. | 55° C. | 65° C. | 75° C. |
| 1 | 0 | 15 | 15 | 15 | 15 |
| 2 | 2 | | 15 | 14 | 21 |
| 3 | 3½ | | | | |
| 4 | 5 | 16 | 14 | 15 | 26 |
| 5 | 7 | 14 | 15 | 42+ | 49+ |
| 6 | 10 | 18 | 17 | 59 | 60 |
| 7 | 15 | 19 | 19 | 61 | 75++ |
| 8 | 20 | 18 | 18 | 63 | |
| 9 | 27 | 20 | 19 | | 80 |
| 10 | 36 | 19 | 22 | 67 | 87 |

+Point of granulation.
++Pellet formation.

It was observed in this series of experiments that the initial definite granulation occured only after the alkali cellulose had increased in apparent density to a point above about 40 grams per 100 milliliters and that pellet formation occurred when the density had been further increased to above about 70 grams per 100 milliliters. In the claims we shall refer to the latter type of product as pellets and to the former as granules.

In order to ascertain the practicability of producing ethers from an alkali cellulose wherein the cellulose viscosity has been reduced below about 8 centipoises, a series of etherifications was carried out on several samples of alkali cellulose having viscosities in the range from about 6 to about 7.6. The etherifying agent was ethyl chloride, the temperature of reaction about 110°–120° C., and the time of reaction varied from 8 to about 11 hours. The results are given in the following table.

Table III

| Viscosity of cellulose in alkali cellulose | Properties of finished ethyl cellulose | | | | | |
|---|---|---|---|---|---|---|
| | Reaction time, hours | Ethoxyl content, percent | Viscosity, centipoises | Tensile strength kg/cm.² | Elongation, percent | Stability, percent |
| 7.6 | 10.75 | 49.5 | 4.1 | 375 | 3 | 100 |
| 7.0 | 8 | 49.2 | 3.6 | | | |
| 7.1 | 8.5 | 49.5 | 3.5 | 374 | 4 | 100 |
| 7.3 | | 49.5 | | 360 | 3 | 93 |
| 6.0 | 8.5 | 48.1 | 3.7 | 246 | 1.3 | |

It is seen from the above table that alkali cellulose prepared and aged according to the herein described method is adapted to the production of low viscosity cellulose ethers, the tensile strength of which is surprisingly high and which have a relatively high stability toward heat treatment. The stability figure represents the per cent of the original viscosity of a sample of ethyl cellulose which is retained after subjecting a film thereof to a temperature of 120° C. for 16 hours. The ethyl cellulose obtained from the experiments recorded in the table was satisfactory for employment in spraying lacquers, varnishes, and similar coating compositions.

Other modes of applying the principle of our invention may be employed instead of those explained, change being made as regards the process herein disclosed, provided the step or steps stated by any of the following claims or the equivalent of such stated step or steps be employed.

We therefore particularly point out and distinctly claim as our invention:

1. The process which comprises aging a finely divided alkali cellulose wherein the alkali and water content corresponds in proportion to a sodium hydroxide solution of between about 75 and about 78.5 per cent concentration, at a temperature between the hardening point of said alkali cellulose and about 100° C. while agitating the alkali cellulose, at least until said alkali cellulose agglomerates into particles wherein the viscosity of the cellulose, when measured in a 3 per cent solution in a cuprammonium hydroxide reagent containing 30 grams of copper and 180 to 200 grams of ammonia per liter, is below about 8 centipoises.

2. The process which comprises aging a finely divided alkali cellulose wherein the alkali and water content corresponds in proportion to a sodium hydroxide solution of between about 75 and about 78.5 per cent concentration, at a temperature between the hardening point of said alkali cellulose and about 100° C. while agitating the alkali cellulose; at least until said alkali cellulose agglomerates into particles wherein the viscosity of the cellulose, when measured in a 3 per cent solution in a cuprammonium hydroxide reagent containing 30 grams of copper and 180 to 200 grams of ammonia per liter, is below about 5 centipoises.

3. The process which comprises aging finely divided alkali cellulose wherein the alkali and water content corresponds in proportion to sodium hydroxide solution of about 76 per cent concentration at a temperature between about 65 and about 75° C., while tumbling the alkali cellulose, for a period between about 10 and about 20 hours, at least until said alkali cellulose agglomerates into substantially spherical particles whereof the apparent density is above about 40 grams per one hundred milliliters, and wherein the viscosity of the cellulose, when measured in a 3 per cent solution in a cuprammonium hydroxide reagent containing 30 grams of copper and 180 to 200 grams of ammonia per liter, is below about 8 centipoises.

FLOYD C. PETERSON.
ALBERT T. MAASBERG.